United States Patent [19]

Hayden, Sr.

[11] Patent Number: 5,331,876
[45] Date of Patent: Jul. 26, 1994

[54] SAW BLADE FOR CUTTING METAL

[75] Inventor: Robert C. Hayden, Sr., Branford, Conn.

[73] Assignee: Sandvik AB, Sandviken, Sweden

[21] Appl. No.: 921,947

[22] Filed: Jul. 30, 1992

[51] Int. Cl.⁵ .................... B23D 61/12; B27B 33/02
[52] U.S. Cl. ........................... 83/661; 83/848; 83/850; 83/851
[58] Field of Search ............... 83/661, 848, 849, 850, 83/835, 851, 852, 853, 854, 855; 30/355

[56] References Cited

U.S. PATENT DOCUMENTS

| 105,261 | 7/1870 | Shailer | 83/851 |
|---|---|---|---|
| 2,635,327 | 4/1953 | Enlow | 83/850 |
| 2,637,355 | 5/1953 | Chapin | 83/850 |
| 3,104,562 | 6/1961 | Kolesh | 76/112 |
| 3,736,828 | 6/1973 | Funakubo | 83/661 |
| 3,973,455 | 8/1976 | Slaats et al. | 83/851 X |
| 4,179,967 | 12/1979 | Clark | 83/661 X |
| 4,423,553 | 1/1984 | Miyawaki | 83/848 X |
| 4,557,172 | 12/1985 | Yoneda | 83/850 X |
| 4,727,788 | 3/1988 | Yoshida et al. | 83/848 |
| 4,784,033 | 11/1988 | Hayden et al. | 83/661 |
| 4,802,396 | 2/1989 | Kuklinski | 83/849 |
| 5,018,421 | 5/1991 | Lucki et al. | 83/661 X |

FOREIGN PATENT DOCUMENTS 8807350.5  5/1989  Fed. Rep. of Germany .

*Primary Examiner*—Rinaldi Rada
*Assistant Examiner*—Clark F. Dexter
*Attorney, Agent, or Firm*—Burns, Doane, Swecker & Mathis

[57] ABSTRACT

Saw blade for sawing metal, the saw blade having straight teeth as well as set teeth. The straight teeth extend higher than the set teeth and are chamfered on both sides such that the chamfers extend below the top edges of the set teeth. The set teeth have, on their outer side corners only, either no chamfer or a small chamfer.

4 Claims, 2 Drawing Sheets

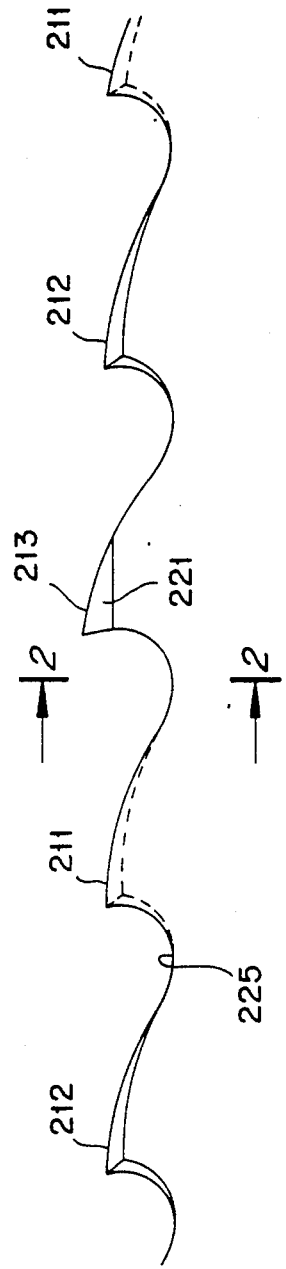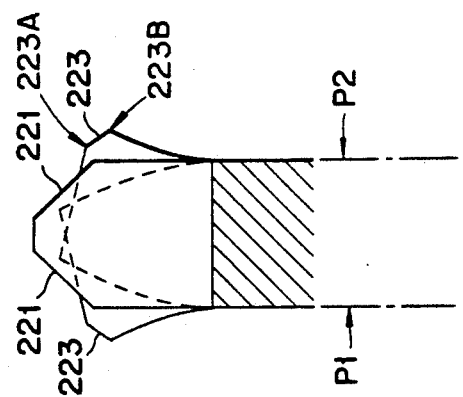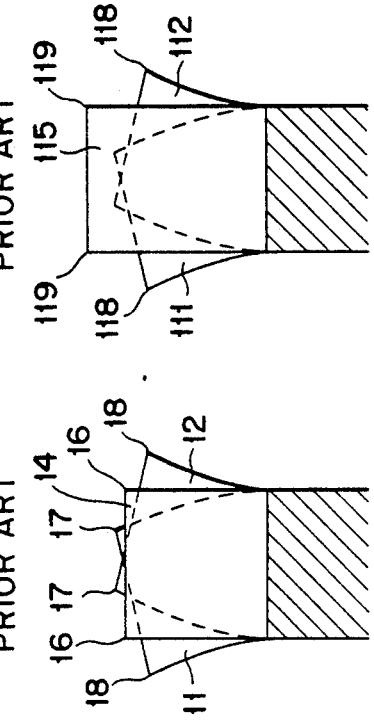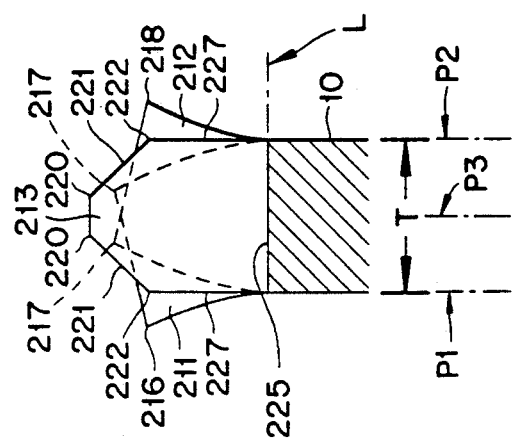

SAW BLADE FOR CUTTING METAL

BACKGROUND OF THE INVENTION

The present invention relates to saw blades, especially for sawing metals. Saw blades for sawing metals are made with teeth of a hard wear-resist material such as tungsten carbide or high-speed steel. Hardness is, however, usually accompanied by brittleness, and metal saw blades often fail by fracturing or chipping at the corners of the teeth, which are highly stressed in conventional saw blade configurations. For example, saw blades for metal sawing in a circular saw, bandsaw or hack saw machines are commonly made with carbide teeth for best wear resistance, the teeth being brazed in place, e.g., see U.S. Pat. No 4,784,033. The carbide teeth are somewhat wider than the steel part of the saw and have fully ground cutting edges. This method produces saws with excellent durability, but is somewhat costly since it involves numerous manufacturing steps and fairly large (thick) carbide pieces.

Saw blades for metal sawing have been proposed in which the teeth have the same thickness as the rest of the blade. At least some of the teeth are set right or left to cut a wider kerf than the blade thickness, thus minimizing friction and permitting passage of chips and coolant. Such blades can be made from a wide strip of spring steel onto the edge of which is welded a narrow strip of high-speed steel. Teeth are then formed in the edge of the narrow strip by grinding, milling or blanking, so that at least the tips of the teeth comprise high-speed steel. The teeth are set right and left by the actuation of mechanical hammers or plungers striking what is to be the inner corner of the tooth, causing local deformation, overstraining and reduced strength at that corner.

Another method to provide wear-resistant teeth with a thickness equal to the blade thickness involves welding small carbide spheres onto the teeth as described in U.S. Pat. No. 3,104,562, followed by grinding the top, sides and face of the teeth flush with the adjacent steel parts of the teeth, and then setting the teeth as described above. Because of the difficulty in choosing grinding parameters suitable for carbide as well as steel, the strength of the edge and corners is less than for edges where the grinding only touches the carbide, such as with welded or brazed teeth which are wider than the blade. The corners are further weakened by the setting, especially if the carbide tips are made wider than the blade.

The stresses in a corner of a tooth during sawing are moderate if the edge is in contact with the sawn material only on one side of the corner, or if the angle of the corner is obtuse. If the edge is in contact with the sawn material on both sides of the corner, the intersecting streams of chips will cause large fluctuating stresses in the corner, especially if the angle is acute. The worst case occurs if the edge on one side is in steady contact with the sawn material, and the edge on the other side is in intermittent contact with the sawn material.

For example, in one type of saw blade according to the prior art, a cross section of which is shown in FIG. 3, the teeth, prior to setting, are of equal height. Because of the tilting of the teeth associated with the setting, all corners of all teeth are exposed to cut the sawn material.

The inner corners 17 of the set teeth 11, 12, which were already weakened by the impact of the setting tool, are highly stressed because the edge is in contact with the sawn material on both sides of the corner, so the set teeth are easily damaged in use. The outer corners 18 are less stressed in use and are not weakened by setting. The vertical or side parts of the edges adjoining the corners 16 of the straight teeth 14 are in intermittent contact with the sawn material, causing large stresses and risk of damage.

Another saw blade according to the prior art, such as U.S. Pat. No. 105,261, is shown in section in FIG. 4 and has straight teeth 115 which are higher than the set teeth 111, 112. In this saw blade the inner corners of the set teeth are not exposed to cutting and are in no risk of damage, but the corners 119 of the straight teeth are very highly stressed especially when entering a cut. Even small damage to the straight teeth will impair the otherwise excellent ability of this blade to produce very straight and smooth cuts. When this blade design is used for a blade with welded-on teeth, it is a common occurrence that the attempt to grind the sides of the blade flat to remove the excess material from the welding will produce a slightly tapering blade where the tips are slightly narrower than the rest of the blade. That tapering will then produce extreme stresses in the straight teeth and require large cutting and feed forces.

SUMMARY OF THE INVENTION

The present invention involves a saw blade comprising a body which carries a plurality of cutting teeth, the cutting teeth being separated by gullets. At least the tips of the teeth are formed of a material which is harder than that of the body and are welded to the body. Some of the teeth are set to the right, some of the teeth are set to the left, and the non-set teeth are straight. A thickness of the tips is no greater than a thickness of the body. The non-set teeth extend higher than the set teeth, i.e., the non-set teeth extend up from the gullets farther than the set teeth and each straight tooth includes side edge portions which are chamfered. Each of the set teeth has a top transverse edge which slopes outwardly such that an outer corner of the transverse edge is located closer to the level of the gullets than is an inner corner of the transverse edge.

Preferably, each chamfer includes one end located remote from an adjacent gullet and another end located approximate such adjacent gullet. The other end is disposed within the border of one of the right and left set teeth as the cutting teeth are viewed in a direction parallel to the direction of cutting.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a fragmentary side elevational view of a saw blade according to the present invention;

FIG. 2 is a cross-sectional view taken along the line 2—2 of FIG. 1;

FIG. 3 is a view similar to FIG. 2 of one prior art saw blade;

FIG. 4 is a view similar to FIG. 2 of a second prior art blade;

FIG. 5 is a view similar to FIG. 2 of a modified embodiment of the present invention;

DETAILED DESCRIPTION OF PREFERRED EMBODIMENTS OF THE INVENTION

Figure 6:
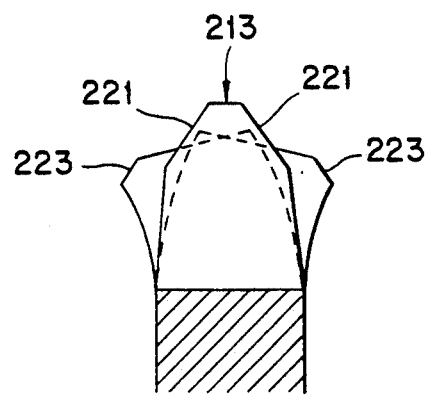
FIG. 6 is a view similar to FIG. 2 of another modified embodiment of the present invention.

According to the present invention, a saw blade is provided which cuts perfectly straight and has high wear resistance even if the corner strength is reduced either by the setting method, or by the use of a brittle edge material or by the particular method of attaching the edge material. A blade according to the invention will cut efficiently even if grinding of the excess weld material has produced a slightly tapering blade. A blade according to the invention is shown in FIGS. 1 and 2 and is characterized by a combination of straight non-set teeth 213 and set teeth 211, 212. Each of the set teeth 211, 212 has a top transverse edge which slopes outwardly such that an outer corner thereof (e.g., outer corner 218 or 216) is located closer to the level L of the gullet than is the inner corner (e.g., see the inner corners 217). The straight non-set teeth 213 have large chamfers 221, and the set teeth 211, 212 have sideways sloping edges without chamfers (or alternatively have very small chamfers 223).

At least the tips of the teeth including the cutting edges are formed of a material harder than the body 10 and can be joined together on a strip (e.g., a stainless steel strip) which is welded to the body, or can comprise separate pieces of hard wear-resistant material (e.g., tungsten carbide) which are welded to the body. The cutting teeth 211-213 have a thickness which is no greater than the thickness T of the body. That thickness is defined by the distance between two parallel side planes P1, P2 of the body. In the embodiment depicted in FIG. 2, the thickness of each cutting tooth is the same as the thickness of the body. If desired, the sides of the straight teeth 213 could be ground so as to have a thickness less than that of the body 10, as depicted in FIG. 6. Each straight tooth is aligned with a center plane P3 of the body which is parallel to the side planes P1, P2.

The straight non-set teeth 213 are higher than the set teeth 211, 212, thus relieving the inner corners 217 of the set teeth from any cutting forces. Each chamfer is so large that it extends toward the gullet 225 and past the transverse edge of a set tooth. For example, the left chamfer of the straight tooth 213 in FIG. 2 extends past the transverse or top edge of the set teeth 211. Hence, the end of each chamfer which is located proximate the gullet (i.e., the end opposite the remote end which forms an obtuse corner 220) forms a corner 222 and is located within the border or confines of a set tooth as the teeth are viewed in a direction parallel to the cutting direction (see FIG. 2). Because of that arrangement, the corners 222 are shielded by the set teeth during a cutting operation and are relieved of any cutting forces, so that the straight teeth are able to cut chips with a trough-shaped section as in the known "triple chip" tooth arrangements such as disclosed in U.S. Pat. No. 4,784,033. The upper corners 220, where the chamfers meet the transverse edge portion, form obtuse angles and have fully ground edges on each side, thereby tending to minimize the wear and damage at the corner. The surface following each chamfer 221 should preferably slope slightly towards the rear of the tooth to form a clearance angle larger than zero degrees.

Since the sides 227 of the straight teeth do not touch the cut material, any small tapering will not affect the cutting or create a wedge action. Although not generally necessary, the wear resistance of the outer corners 218 of the set teeth can be improved by the grinding of small chamfers 223 on them as shown in FIG. 5, which shows an alternative embodiment of the invention. This will also produce a cut surface with better smoothness. Each chamfer 223 produces two corners 223A, 223B on the respective set tooth, both of which corners lie outside of the respective side planes P1 and P2.

The arrangement of teeth along the toothed edge of the saw blade preferably comprises recurring groups of teeth, each group containing at least one straight tooth, at least one left hand set tooth and at least one right hand set tooth, where the order (sequence) of teeth in each group and the distances between the teeth is repeated in successive groups.

Figure 7:
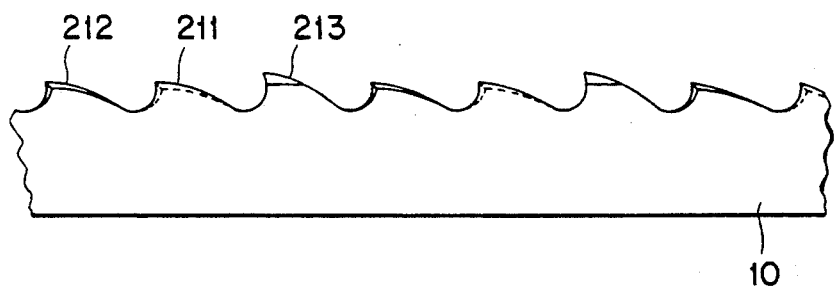
FIG. 7 is a fragmentary side elevational view of a saw blade according to the present invention in the form of a band for use in a bandsaw.

FIG. 7 depicts the blade according to the invention in the form of a narrow band for use in a bandsaw.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A saw blade for cutting metal, comprising a body having first and second sides and carrying a plurality of sets of three cutting teeth, said first and second sides defining respective parallel side planes, said cutting teeth of said body being separated by gullets, at least the tips of said teeth of each set being formed of a carbide material harder than said body, a thickness of each carbide tip being no greater than a thickness of said body, each set of teeth consisting of a non-set tooth substantially aligned with a center plane of said blade lying parallel to said side planes, a first set tooth set to said first side, and a second set tooth set to said second side, said non-set teeth projecting up from said gullets farther than each of said set teeth, each non-set tooth including side edge portions which are chamfered such that a first end of said chamfer is located closer to said gullets than a second end of said chamfer, said first end of said chamfer forming a corner lying within a border formed by the set teeth as said saw blade is viewed in a direction parallel to a direction of cutting, whereby said corner is shielded from cutting forces during a cutting operation, each of said set teeth having a top transverse edge which slopes outwardly toward and beyond a respective one of said side planes such that said top transverse edge includes an outer portion situated outside of said respective side plane of, and an inner corner situated between said first and second sides, said outer portion of said transverse edge being located closer to said gullets than said inner corner of said transverse edge, said outer portion of each set tooth having a chamfer which is smaller than said chamfers of said non-set teeth and which forms two corners on said outer portion, both of said corners of each said set tooth chamfer lying outside of said respective side plane.

2. The saw blade according to claim 1, wherein said non-set teeth are ground so as to be of less thickness than said body.

3. The saw blade according to claim 2, wherein said blade is in the shape of a narrow band adapted for use in a bandsaw.

4. The saw blade according to claim 1, wherein said blade is in the shape of a narrow band adapted for use in a bandsaw.

* * * * *